US012749475B2

(12) United States Patent
Lee et al.

(10) Patent No.: US 12,749,475 B2
(45) Date of Patent: Sep. 29, 2026

(54) STREAMING SPEECH SYNTHESIS METHOD AND SYSTEM FOR SUPPORTING REAL-TIME CONVERSATION MODEL

(71) Applicant: Korea Electronics Technology Institute, Seongnam-si (KR)

(72) Inventors: Young Han Lee, Seongnam-si (KR); Choong Sang Cho, Seongnam-si (KR); Tae Woo Kim, Seongnam-si (KR); Je Woo Kim, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 101 days.

(21) Appl. No.: 18/395,840

(22) Filed: Dec. 26, 2023

(65) Prior Publication Data

US 2025/0191571 A1 Jun. 12, 2025

(30) Foreign Application Priority Data

Dec. 11, 2023 (KR) ........................ 10-2023-0178603

(51) Int. Cl.
*G10L 13/02* (2013.01)

(52) U.S. Cl.
CPC .................................... *G10L 13/02* (2013.01)

(58) Field of Classification Search
CPC ......... G06N 20/00; G10L 13/02; G10L 13/08; G10L 13/047; G10L 15/26; G10L 13/00
See application file for complete search history.

(56) References Cited

U.S. PATENT DOCUMENTS 8,868,422 B2 * 10/2014 Hirabayashi .......... G10L 13/033 704/260
12,367,870 B2 * 7/2025 Grossmann ......... G10L 15/1815
2004/0167780 A1 * 8/2004 Ferencz .................. G10L 13/07 704/258
2007/0271099 A1 * 11/2007 Kagoshima ............. G10L 13/02 704/201
2009/0018836 A1 * 1/2009 Morita .................... G10L 13/07 704/260
2019/0189117 A1 * 6/2019 Kumar ................ G06F 16/3329
2019/0198016 A1 * 6/2019 McKenzie .......... G10L 15/1822
(Continued)

OTHER PUBLICATIONS

Dekel, Avihu, et al. "Speak while you think: Streaming speech synthesis during text generation." *ICASSP 2024-2024 IEEE International Conference on Acoustics, Speech and Signal Processing (ICASSP)*. IEEE, Sep. 20, 2023. pp. 1-5.
(Continued)

*Primary Examiner* — Jakieda R Jackson
(74) *Attorney, Agent, or Firm* — NSIP Law

(57) ABSTRACT

There is provided a streaming speech synthesis method and system for supporting a real-time conversation model. A real-time speech synthesis method according to an embodiment outputs a sentence for responding to an utterance of a user in the unit of a text through a conversation model, and synthesizes a speech in the unit of the outputted text through a speech synthesis model. Accordingly, a text which is a shorter unit than a sentence is continuously received and is immediately synthesized into a speech, so that speech synthesis can be performed in real time according to a speed of a real-time conversation model without delay even when a conversation is generated in the unit of a text in the real-time conversation model.

17 Claims, 4 Drawing Sheets

(56) References Cited

U.S. PATENT DOCUMENTS

| | | | | |
|---|---|---|---|---|
| 2020/0274970 | A1* | 8/2020 | Ding | G06N 20/00 |
| 2021/0224319 | A1* | 7/2021 | Ingel | G06F 16/686 |
| 2021/0326372 | A1* | 10/2021 | Ramachandra | G06N 3/006 |
| 2022/0059072 | A1* | 2/2022 | Zhang | G10L 13/047 |
| 2023/0096543 | A1* | 3/2023 | Moy | G06F 40/58<br>704/3 |
| 2023/0352001 | A1* | 11/2023 | Carmiel | G10L 13/10 |
| 2024/0177711 | A1* | 5/2024 | Nelson | G06Q 30/015 |
| 2024/0330608 | A1* | 10/2024 | Moy | G10L 15/005 |
| 2025/0168465 | A1* | 5/2025 | Ingel | G10L 13/033 |

OTHER PUBLICATIONS

Korean Office Action issued on Feb. 28, 2025 in corresponding Korean Patent Application No. 10-2023-0178603 (5 pages in English and 7 pages in Korean).

* cited by examiner

STREAMING SPEECH SYNTHESIS METHOD AND SYSTEM FOR SUPPORTING REAL-TIME CONVERSATION MODEL

CROSS-REFERENCE TO RELATED APPLICATION(S) AND CLAIM OF PRIORITY

This application is based on and claims priority under 35 U.S.C. § 119 to Korean Patent Application No. 10-2023-0178603, filed on Dec. 11, 2023, in the Korean Intellectual Property Office, the disclosure of which is herein incorporated by reference in its entirety.

BACKGROUND

Field

The disclosure relates to a speech synthesis technology, and more particularly, to a speech synthesis method and system for supporting a real-time conversation model which outputs a response utterance in the unit of a text rather than in the unit of a sentence.

Description of Related Art

FIG. 1 is a view illustrating a related-art speech synthesis system. As shown in FIG. 1, a related-art speech synthesis system generates a conversation in the unit of a sentence at a conversation model (decoder) and outputs the conversation, and synthesizes a speech in the unit of a sentence at a speech synthesizer (encoder).

Speech synthesis systems employing the method shown in FIG. 1 are widely used for various services such as an announcement service, a virtual assistant service. To this end, there is no need to synthesize a speech in a smaller unit than a sentence.

However, recently, there is an attempt to generate a conversation content in the unit of a text shorter than a sentence through a conversation model in real time. This method has the merits of outputting a conversation in a unit shorter than a sentence, and concurrently, analyzing an utterance content of a user and responding thereto. Due to such merits, there is an advantage that a more human-like conversation can be modeled.

However, in related-art speech technologies, an input is still received in the unit of a sentence, and hence, there is a problem that a speech is not generated until a sentence is completed although a text is generated in real time in a conversation model, and a speech is generated through a speech synthesizer after a sentence is completed.

SUMMARY

The disclosure has been developed in order to solve the above-described problems, and an object of the disclosure is to provide, as a solution for synthesizing a speech without delay in outputting from a real-time conversation model, a method and a system for synthesizing a speech in real time upon continuously receiving a text which is a unit shorter than a sentence.

According to an embodiment of the disclosure to achieve the above-described object, a real-time speech synthesis method may include: a step of outputting, by a conversation model, a sentence for responding to an utterance of a user in the unit of a text; and a step of synthesizing, by a speech synthesis model, a speech in the unit of the outputted text.

The step of outputting may include outputting texts constituting the sentence while the sentence for responding is not completed.

The step of synthesizing may include synthesizing a speech from the outputted texts while all of the texts constituting the sentence are not outputted at the step of outputting.

The real-time speech synthesis may further include a step of outputting, by a speech output module, the synthesized speech in the unit of a text. The conversation model may be a machine learning model that is trained to receive an utterance of a user and to generate a sentence for responding to the utterance.

The step of outputting may include outputting the synthesized speech while a user is uttering.

The speech synthesis model may be a machine learning model that is trained to receive a text and to synthesize a speech.

The speech synthesis model may further receive a part of a text that is synthesized into a speech in a previous section, and may synthesizes a speech.

The speech synthesis model may further receive a part of a text that is synthesized into a speech in a next section, and synthesizes a speech.

According to another aspect of the disclosure, there is provided a real-time speech synthesis system including: a conversation model configured to output a sentence for responding to an utterance of a user in the unit of a text; and a speech synthesis model configured to synthesize a speech in the unit of the text outputted from the conversation model.

According to still another aspect of the disclosure, there is provided a real-time speech synthesis method including: a step of synthesizing, by a speech synthesis model, a speech in the unit of a text with respect to a sentence which is outputted from a conversation model in the unit of a text; and a step of outputting, by a speech output module, the synthesized speech in the unit of a text.

According to yet another aspect of the disclosure, there is provided a real-time speech synthesis system including: a speech synthesis model configured to synthesize a speech in the unit of a text with respect to a sentence which is outputted from a conversation model in the unit of a text; and a speech output module configured to output the speech synthesized in the speech synthesis model in the unit of a text.

As described above, according to embodiments of the disclosure, a text which is a shorter unit than a sentence is continuously received and is immediately synthesized into a speech, so that speech synthesis can be performed in real time according to a speed of a real-time conversation model without delay even when a conversation is generated in the unit of a text in the real-time conversation model.

According to embodiments of the disclosure, conversation generation and speech synthesis are performed in the unit of a text shorter than a sentence, so that a memory capacity necessary for a system can be reduced and a processing speed can be enhanced.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

Embodiments of the disclosure provide a streaming speech synthesis method and system for supporting a real-time conversation model. The disclosure relates to a technology for continuously generating and outputting a speech in the unit of a text without delay when generating a conversation in the unit of a text shorter than a sentence in a real-time conversation model.

Figure 1:
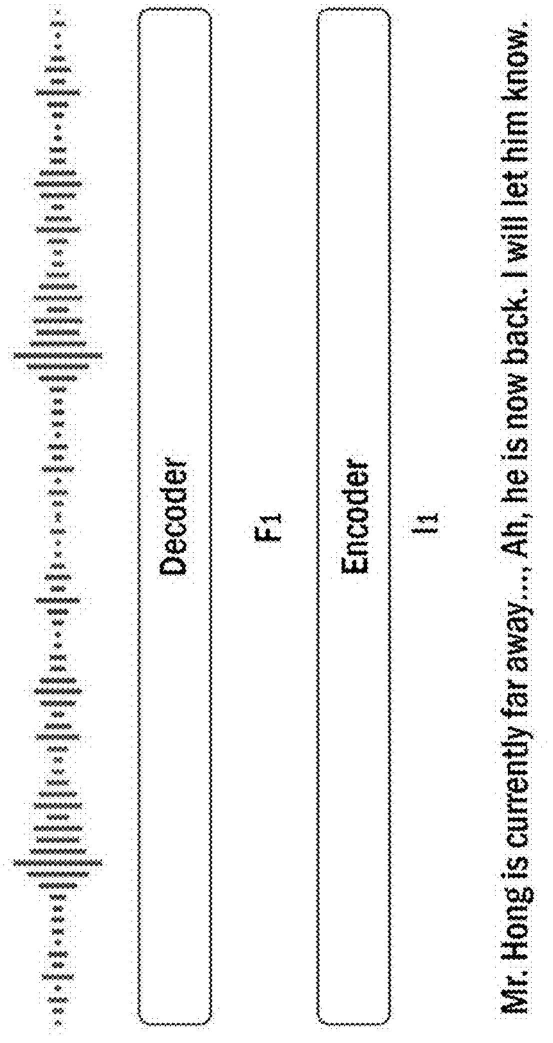
FIG. 1 (Related Art)
FIG. 1 is a view illustrating a related-art speech synthesis system.
Figure 2:
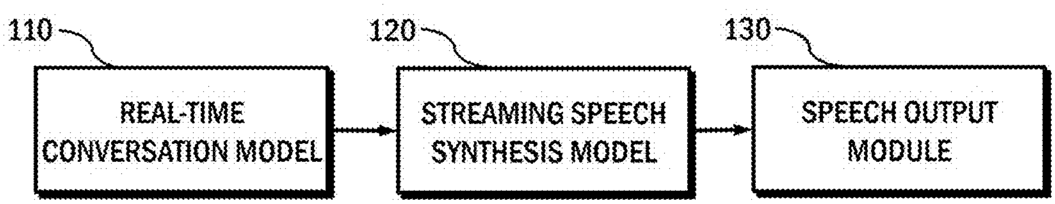
FIG. 2 is a view illustrating a real-time streaming speech synthesis system according to an embodiment of the disclosure.

FIG. 2 is a view illustrating a configuration of a real-time streaming speech synthesis system according to an embodiment of the disclosure. As shown in FIG. 2, the speech synthesis system according to an embodiment of the disclosure may include a real-time conversation model 110, a streaming speech synthesis model 120, and a speech output module 130.

The real-time conversation model 110 is a machine learning model that is trained to receive an utterance of a user and to generate and output a sentence for responding to the user utterance in the unit of a text, or a processor for executing the machine learning model. Herein, the "text" used herein refers to a unit shorter than a sentence, for example, a word, a phrase, a clause.

The real-time conversation model 110 generates and outputs a sentence for responding to a user in the unit of a text, that is, outputs a sentence in the unit of a text in the middle of generating the sentence. That is, the real-time conversation model 110 may output texts constituting a sentence even when the sentence for responding is not fully completed.

Figure 3:
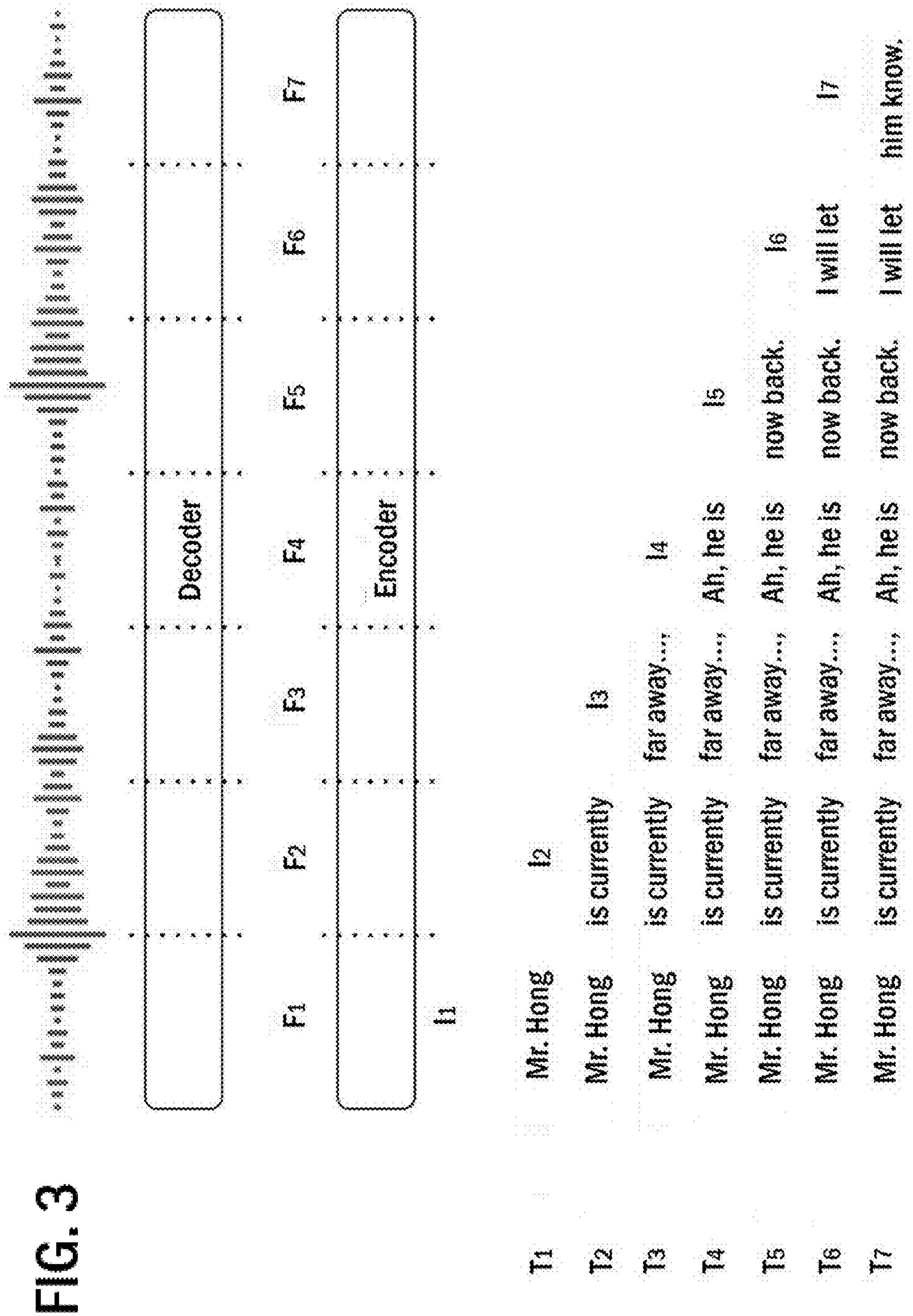
FIG. 3 is a view illustrating a real-time speech synthesis method according to an embodiment of the disclosure.

In FIG. 3, a decoder indicates the real-time conversation model 110. As shown in FIG. 3, the real-time conversation model 110 generates and outputs a sentence for responding to a user in the unit of a text ($F_1$, $F_2$, $F_3$, . . . , $F_7$).

Referring back to FIG. 2, the streaming speech synthesis model 120 is a machine learning model that is trained to receive texts from the real-time conversation model 110 and to synthesize a speech, or a processor for executing the machine learning model.

Since the output of the real-time conversation model 110 is comprised of texts, input, speech synthesis, output of a synthesized speech of the streaming speech synthesis model 120 may be performed in the unit of a text.

In FIG. 3, an encoder indicates the streaming speech synthesis model 120. As shown in FIG. 3, the streaming speech synthesis model 120 generates and outputs corresponding voices ($I_1$, $I_2$, $I_3$, . . . , $I_7$) in the unit of a text ($F_1$, $F_2$, $F_3$, . . . , $F_7$).

Accordingly, 1) in a $T_1$ section, a text $F_1$ is generated and outputted from the real-time conversation model 110, and a corresponding voice $I_1$ is synthesized and outputted from the streaming speech synthesis model 120, 2) in a $T_2$ section, a text $F_2$ is generated and outputted from the real-time conversation model 110, and a corresponding voice $I_2$ is synthesized and outputted from the streaming speech synthesis model 120, 3) in a $T_3$ section, a text $F_3$ is generated and outputted from the real-time conversation model 110, and a corresponding voice $I_3$ is synthesized and outputted from the streaming speech synthesis model 120, and in the same way, 7) in a $T_7$ section, a text $F_7$ is generated and outputted from the real-time conversation model 110, and a corresponding voice $I_7$ is synthesized and outputted from the streaming speech synthesis model 120.

That is, speech synthesis is performed by the streaming speech synthesis model 120 in real time in the unit of a text even when all texts constituting a sentence is not outputted from the real-time conversation model 110.

If speech synthesis is performed by the streaming speech synthesis model 120 in the unit of a sentence, speech synthesis may start after all of the texts $F_1$, $F_2$, $F_3$, . . . , $F_7$ constituting the sentence are outputted from the real-time conversation model 110, and thus, a time delay corresponding to $T_1$ to $T_7$ may occur.

Referring back to FIG. 2, the speech output module 130 continuously generates and outputs a speech signal in the unit of a text with respect to the speech which is synthesized and outputted from the streaming speech synthesis model 120 in the unit of a text.

Since the response generation by the real-time conversation model 110 and the speech synthesis by the streaming speech synthesis model 1120 are performed in the unit of a text rather than in the unit of a sentence, the speech output module 130 may output a synthesized speech even when the user does not yet finish uttering.

Figure 4:
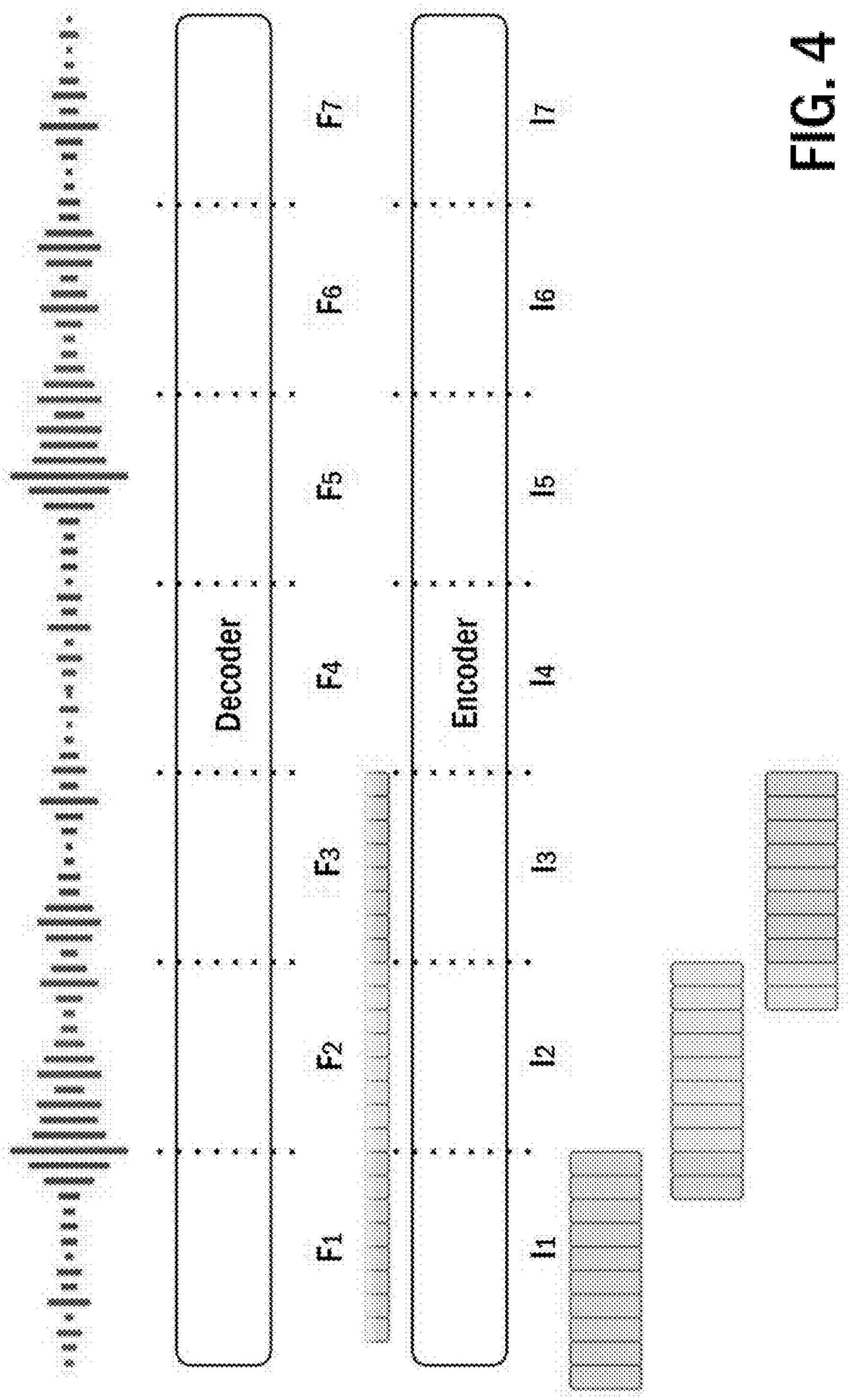
FIG. 4 is a view illustrating a real-time speech synthesis method according to another embodiment of the disclosure.

FIG. 4 is a view illustrating a real-time streaming speech synthesis method according to another embodiment of the disclosure. The method of FIG. 4 differs from the method of FIG. 3 in that the streaming speech synthesis model 120 further receives a part of a text that has been synthesized into a speech in a previous section, in addition to texts outputted from the real-time conversation model 110, and synthesizes the same.

Specifically, in synthesizing a speech (12) in a $T_2$ section, a rear part of a previous text $F_1$ is inputted to the streaming speech synthesis model 120 in addition to a current text $F_2$, and is used.

This is to solve a frame gap that may occur at a connection between texts. A length of the rear part of the previous text added to the current text is limited to short than a half of the length of the current text.

Furthermore, it is also possible to add a front part of the next text to the current text in addition to adding the rear part of the previous text to the current text. However, in this case, speech synthesis for the current text may be delayed until the next text is outputted, but smoother speech synthesis may be achieved.

Up to now, a streaming speech synthesis method and system for supporting a real-time conversation model has been described in detail with reference to preferred embodiments.

In the above-described embodiments, speech synthesis is performed in the unit of a text shorter than a sentence upon continuously receiving an input in the unit of a text, so that an input unit of the streaming speech synthesis model matches an output unit of the real-time conversation and service can be provided while minimizing a system delay through real-time interoperation between the two models.

Furthermore, in generating a speech, only inputs neighboring a speech to be generated is considered rather than analyzing all inputs of a sentence, so that there is an advantage that a memory capacity necessary for inference is reduced, and in proportion to this, an amount of calculation is reduced.

In addition, a part of a previous text or a next text is further added to the input of a text, so that an algorithm delay is not greatly increased and smooth continuity between synthesized voices increases.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A processor-implemented method for real-time speech synthesis, the method comprising:

receiving, by a processor, a streaming utterance of a user in real time;

generating, by a machine-learning-based conversation model, a response sentence incrementally in units of one or more texts in real time for responding to the streaming utterance of the user, wherein the machine-learning-based conversation model incrementally outputs the units of one or more texts constituting the response sentence even when the response sentence is not fully completed; and synthesizing, by a machine-learning-based speech synthesis model, streaming speech waveforms corresponding to each of the units of the one or more texts as output by the machine-learning-based conversation model, such that the synthesizing occurs before an entire response sentence corresponding to an entire utterance of the user is generated from the machine-learning-based conversation model, wherein an input unit of the machine-learning-based speech synthesis model matches an output unit of the machine-learning-based conversation model, thereby minimizing a system delay through real-time interoperation between the machine-learning-based conversation model and the machine-learning-based speech synthesis model.

2. The real-time speech synthesis method of claim 1, wherein the synthesizing comprises synthesizing, by the machine-learning-based speech synthesis model, partial speech waveforms corresponding to the incrementally output texts in real time before all of the texts constituting the response sentence are generated.

3. The real-time speech synthesis method of claim 1, further comprising continuously outputting, by a speech output module, streaming speech segments corresponding to the synthesized partial texts as generated in real time.

4. The real-time speech synthesis method of claim 3, wherein the machine-learning-based conversation model is a machine learning model that is trained with conversational context data to generate a response sentence in an incremental streaming manner in units of one or more texts based on the streaming utterance of the user received in real time and to generate a sentence for responding to the streaming utterance.

5. The real-time speech synthesis method of claim 4, wherein the outputting comprises outputting the streaming speech synthesized while the user is uttering.

6. The real-time speech synthesis method of claim 3, wherein the machine-learning-based speech synthesis model is a machine learning model that is trained to convert incrementally received texts into audio features and to synthesize streaming speech in response to partial text input.

7. The real-time speech synthesis method of claim 6, wherein the machine-learning-based speech synthesis model further receives a part of a text that is synthesized into a speech in a previous section, and synthesizes the streaming speech.

8. The real-time speech synthesis method of claim 7, wherein the machine-learning-based speech synthesis model further receives a part of a text that is synthesized into a speech in a next section, and synthesizes the streaming speech.

9. A real-time speech synthesis system comprising:

one or more processors including:

a conversation model configured to receive a streaming utterance of a user in real time and generate a response sentence incrementally in units of one or more texts in real time for responding to the streaming utterance of the user, wherein the conversation model incrementally outputs the units of one or more texts constituting the response sentence even when the response sentence is not fully completed; and a speech synthesis model configured to synthesize streaming speech waveforms corresponding to each of the units of the one or more texts as output by the conversation model, such that the synthesizing occurs before a complete response sentence corresponding to an entire utterance of the user is generated from the conversation model, wherein an input unit of the speech synthesis model matches an output unit of the conversation model, thereby minimizing a system delay through real-time interoperation between the conversation model and the speech synthesis model.

10. The system of claim 9, wherein, for the synthesizing, the one or more processors are further configured to synthesize, by the machine-learning-based speech synthesis model, partial speech waveforms corresponding to the incrementally output texts in real time before all of the texts constituting the response sentence are generated.

11. The system of claim 9, wherein the one or more processors are further configured to continuously output, by a speech output module, streaming speech segments corresponding to the synthesized partial texts as generated in real time.

12. The system of claim 11, wherein the machine-learning-based conversation model is a machine learning model that is trained with conversational context data to generate a response sentence in a token-wise streaming manner based on the streaming utterance of the user received in real time and to generate a sentence for responding to the streaming utterance.

13. The system of claim 12, wherein, for the outputting, the one or more processors are configured to output the streaming speech synthesized while the user is uttering.

14. The system of claim 11, wherein the machine-learning-based speech synthesis model is a machine learning model that is trained to convert incrementally received texts into audio features and to synthesize streaming speech in response to partial text input.

15. The system of claim 14, wherein the machine-learning-based speech synthesis model further receives a part of a text that is synthesized into a speech in a previous section, and synthesizes the streaming speech.

16. The system of claim 15, wherein the machine-learning-based speech synthesis model further receives a part of a text that is synthesized into a speech in a next section, and synthesizes the streaming speech.

17. A computer-implemented method for real-time speech synthesis, the method comprising:

synthesizing, by a machine-learning-based speech synthesis model implemented by a processor, streaming speech waveforms corresponding to partial text segments output incrementally by a machine-learning-based conversation model while the conversation model is still generating the response sentence, wherein the machine-learning-based conversation model incrementally outputs units of one or more texts constituting the response sentence even when the response sentence is not fully completed; and outputting, by a speech output module implemented by the processor, the synthesized speech in the unit of a text to a user device in real time concurrently while performing a process of the synthesizing, wherein an input unit of the machine-learning-based speech synthesis model matches an output unit of the machine-learning-based conversation model, thereby minimizing a system delay through real-time interoperation between the machine-learning-based conversation model and the machine-learning-based speech synthesis model.

* * * * *